(12) United States Patent
Müller

(10) Patent No.: US 6,253,925 B1
(45) Date of Patent: Jul. 3, 2001

(54) MECHANICAL GAP FILTER

(76) Inventor: Hans Müller, Pejlingsvägen 6, S-506 70, Frufällan (SE)

( * ) Notice: Subject to any disclaimer, the term of this patent is extended or adjusted under 35 U.S.C. 154(b) by 0 days.

(21) Appl. No.: 09/266,297

(22) Filed: Mar. 11, 1999

(51) Int. Cl.[7] ....................................................... B07B 1/00
(52) U.S. Cl. .......................... 209/235; 209/305; 209/666; 210/493.5
(58) Field of Search ..................................... 209/235, 273, 209/305, 666; 210/493.1, 493.4, 493.5

(56) References Cited

U.S. PATENT DOCUMENTS

| 15,634 | * | 8/1856 | Stedman et al. | 209/666 |
| 1,346,438 | * | 7/1920 | Ballou | 209/666 |

FOREIGN PATENT DOCUMENTS

| 5-146761 | * | 6/1993 | (JP) | 209/666 |
| 481335 | * | 4/1973 | (SU) | 209/666 |

* cited by examiner

Primary Examiner—Tuan N. Nguyen
(74) Attorney, Agent, or Firm—Orum & Rotet

(57) ABSTRACT

The invention relates to an arrangement (5) for a filter (6) for plastic material in the form of granulates supplied to an injection nozzle (7), whereby accommodated internally in a casing (8) is a filter body (20) extending in the longitudinal sense of the casing. The filter body (20) consists of metal or some other hard material. Arranged essentially in the longitudinal extent (10) of the filter body (20) is a number of groove-shaped unevennesses (11, 12) in the form of peaks (11) and valleys (12) extending along the filter body on its envelope surface, which unevennesses are executed so as to extend internally within the casing (8) at a distance (S) from it. A gap (9) is formed between the peaks (11) and the casing (8). The function of the filter body (20) and casing (8) is for quantities of intended objects (14) of a specific kind removable by filtration to be arranged in such a way as to be prevented from moving past the peaks (11), and to be collected instead in interjacent valleys (12A) for subsequent removal.

8 Claims, 2 Drawing Sheets

MECHANICAL GAP FILTER

BACKGROUND OF THE INVENTION

1. Field of the Invention

The present invention relates to a nozzle intended for injection moulding machines. It relates more specifically to a nozzle of this kind provided with a filter.

2. Description of the Related Art

Filtering nozzles are previously disclosed in a number of embodiments. One disadvantage associated with the previously disclosed nozzles is that the nozzle must be removed from the machine at regular intervals and dismantled for cleaning of the filter insert.

This clearly represents a significant disadvantage, since costly machine time is used up in this way. It is also often associated with problems in effectively cleaning the filter.

The aim of the invention was thus, in the first instance, to make available a nozzle, in which cleaning of the filter can take place rapidly and preferably without the nozzle requiring either to be removed from the machine or dismantled.

In order to achieve this and other aims, the invention exhibits the characteristics that can be appreciated from the Patent Claims.

BRIEF DESCRIPTION OF THE DRAWINGS

The invention is described below as a number of preferred illustrative embodiments with reference to the accompanying drawings, in which.

DETAILED DESCRIPTION OF THE INVENTION

Figure 1:
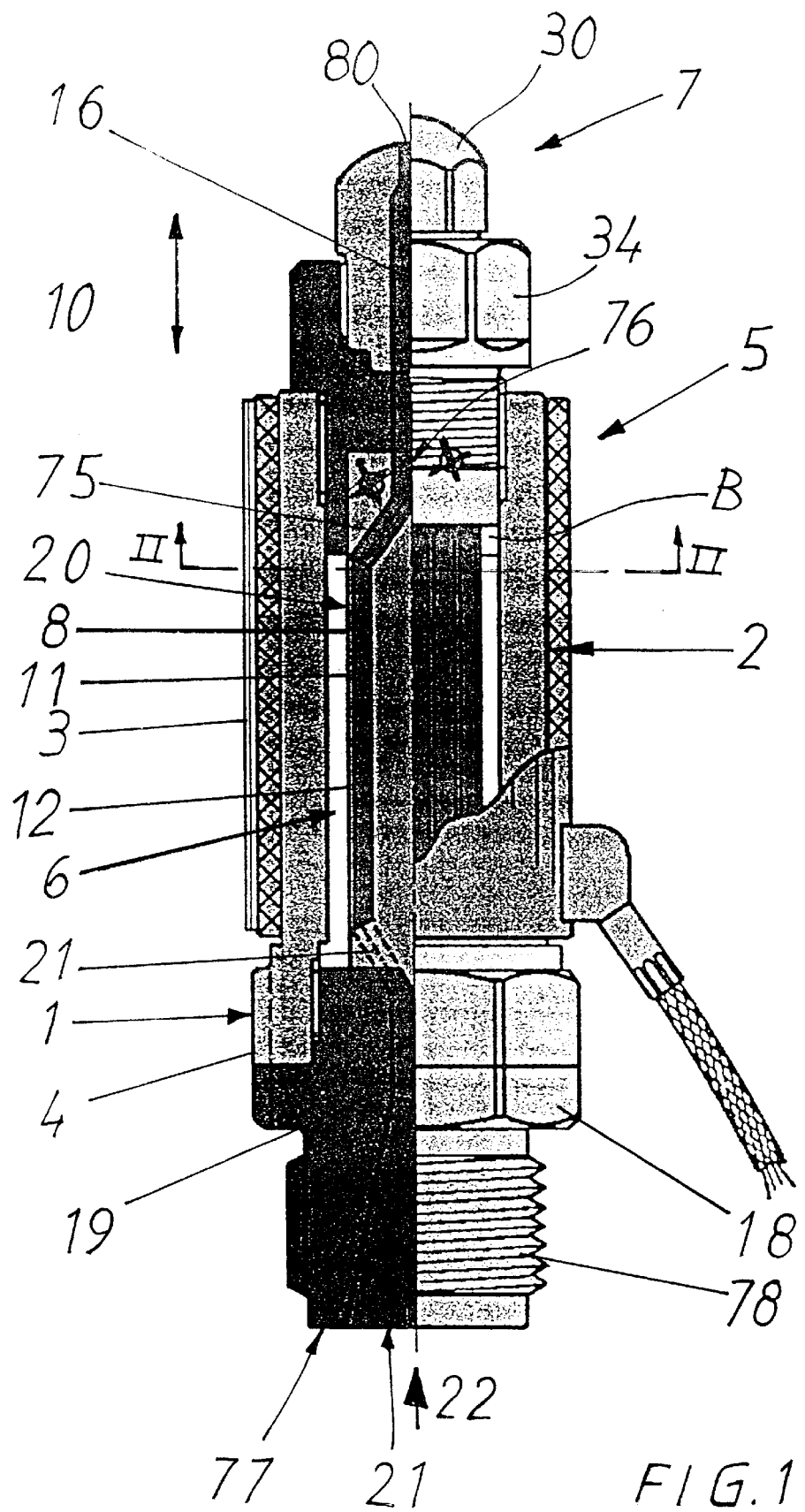
FIG. 1 shows a longitudinal section through a nozzle.

The invention is described below in conjunction with a filter insert, which is particularly suitable for the purpose, although it must be emphasized that it can also be applied to nozzles with filter inserts of other construction.

The nozzle illustrated in the drawing comprises a nozzle body designated with the number 1 having an external surface against which there lies a heating element 2 intended for heating the nozzle. This is covered by a guard plate 3, which is attached to and guided by a rear part 4 of the nozzle body 1.

The proposed arrangement 5 in accordance with the invention is intended for use in a filter 6 for plastic material in the form of granulates, which are transported under pressure to an intended injection nozzle 7. Accommodated internally and executed as an insert in a casing 8 is a filter body 20 extending in the longitudinal sense of the casing. Said filter body 20 consists of metal or some other hard material. Arranged essentially in the longitudinal extent 10 of the filter body 20 is a number of groove-shaped unevennesses in the form of peaks 11 and valleys 12 extending along the filter body 20 on its envelope surface. These unevennesses 11, 12 are executed so as to extend internally within the casing 8 at a certain distance S from it, e.g. between 0.12 and 0.8 mm, depending on the material to be filtered. A gap 9 is formed in this way between the peaks 11 and the casing 8. The function of the arrangement 5 and its filter body 20 and the casing 8 is for quantities of intended objects 14 of a specific kind removable by filtration, e.g. exceeding a specific size, to be arranged in such a way as to be prevented from passing through the gap 9 and past the peaks 11, and to be collected instead in specific interjacent valleys 12A. Smaller objects 15, which are intended to be allowed to pass for injection via the nozzle 7, can pass through the gaps 9 and are discharged via other remaining valleys 12B.

Said peaks 11 exhibit an essentially pointed cross-sectional form, while the valleys 12 exhibit a curved, wave-shaped cross-sectional form.

The groove-shaped unevennesses 11, 12 can exhibit varying form, for example by extending at an angle or in the form of a spiral over the filter body 20 or straight along the filter body 20. The unevennesses 11, 12 are preferably uniformly distributed along the circumference of the filter body 20 and with equal spacing 13.

Figure 2:
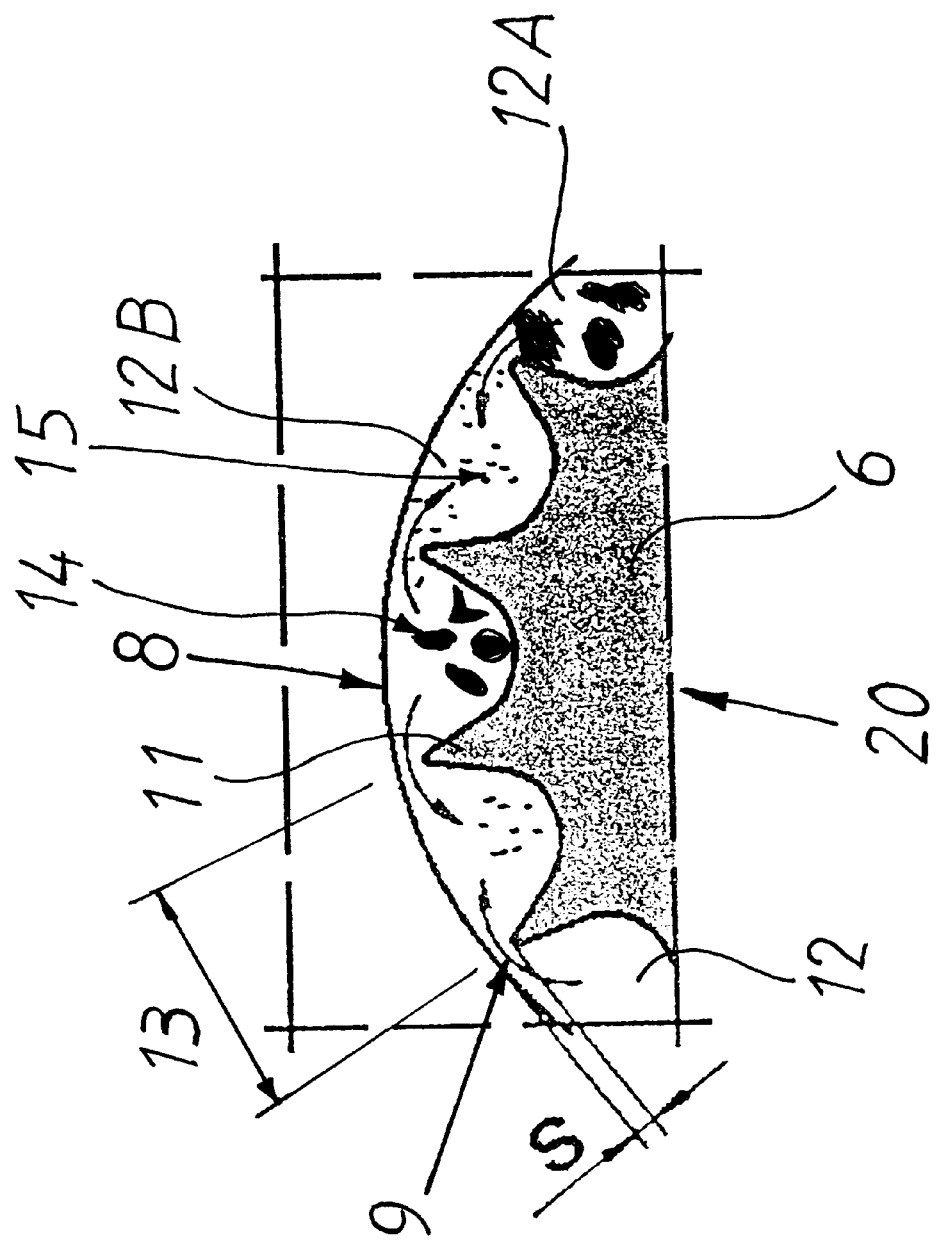
FIG. 2 shows a sectional view along line II—II in FIG. 1.

The plastic which leaves the machine must pass through angled openings 21 in one part of the filter insert 20. As a result, it enters the grooves 12 with which these openings are associated, although it cannot reach the discharge opening 16 of the nozzle other than by first flowing over the peaks 11 between the grooves 12 and then reaching the grooves 12 which, via angled openings 75 at the front, lead to the discharge opening 16 of the nozzle. Because the gap 9 between these groove peaks 11, which act as ridges, and the central passage of the nozzle is narrow, the result will be for any impurities 14 greater in size than the gap S to remain in the grooves 12A which the plastic entered initially. Every second groove 12A thus collects such impurities. FIG. 2. When it is wished to clean the filter, it may appropriately be screwed out for a short distance. The cylindrical part of the filter insert 20 means that only those grooves that have angled holes 75 on the outlet side can conduct plastic through the nozzle. The grooves 12A which contain impurities 14 are connected to a space B, into which they can accordingly be pressed. Since this space has a large diameter, the impurities are able to enter this space and to circulate within it. They are able to reach the central outlet channel 16 of the filter via angled holes in the outlet, from where they can be forced out through the nozzle.

The nozzle body 1 exhibits a highly polished passage, which is transformed into a further transcurrent hole, which is transformed in turn into a hole via a threaded part.

The nozzle also comprises a connection part with the designation 77 intended to be connected to the injection moulding machine for interaction with the externally threaded thread 78 of the connection body, which interacts with a corresponding threaded hole in the injection moulding machine.

The connection part 77 also exhibits an external grip 18 for a spanner.

The connection part 77 is penetrated by a central, conical part 21, which is transformed into a cylindrical part 19, which is transformed in turn into the angled holes 21. The connection part 77 is linked to the nozzle body 1 through the interaction between the threaded parts.

The cylindrical filter unit with the designation 20, in the envelope surface of the cylindrical part of which a number of mutually parallel and axially oriented grooves 12 is contained, is thus inserted into the nozzle body 1.

Every second groove 12A is connected via the angled holes 21 with one end surface of the filter unit, shown in this case as the left end, and every second groove 12B is connected via the angled holes 75 with a central discharge opening 76 arranged in the opposite end of the filter unit, shown in this case as the right end. All the grooves will thus be blocked at one end, which means that the flow 22 of plastic, which arrives from the injection moulding machine and passes into the grooves 12A via the holes 21, is unable to reach the discharge opening 16 via the holes 75, and that the flow of plastic in question must instead pass over the peaks 11 that are formed between the grooves 12A, 12B in order to reach those grooves 12B which, via the holes 75, are in direct contact with the discharge opening 16.

Because the gap 9 between the internal envelope surface of the nozzle body 1 and the filter unit 20 is less than the diameter of the impurities that are to be trapped by the filter unit, any such large impurities 14 will remain in the grooves 12A, while the smaller plastic granules 15 will pass over and continue on their way through the grooves 12B.

In the embodiment shown here, the nozzle is provided with a replaceable nozzle tip 30, which, via an external thread, is connected to a corresponding inner thread in the filter unit. This nozzle tip exhibits an end surface, which is formed in such a way as to interact in a sealing fashion with a corresponding surface in the injection moulding tool. The nozzle tip also exhibits a grip 34 for a spanner and a discharge opening 80.

The function of the nozzle during operation should have emerged clearly from the foregoing. The flow of plastic, whose direction as it leaves the injection moulding machine is indicated by the arrow 22 in FIG. 1, must, on its way out through the nozzle, first divide itself up via the holes 21 into axial sub-flows in the grooves 12, and then pass via peripheral movements over the peaks 11 which delimit the grooves 12 and the holes 75 in order to arrive at the discharge opening 76 of the filter unit and finally at the discharge opening of the whole nozzle.

In order to free the filter unit 20 from its impurities 14, it is now sufficient in accordance with the invention—as can be appreciated from the lower part of FIG. 1—to unscrew the filter unit slightly from the nozzle body, for example by 2–5 mm.

With the filter insert in this unscrewed position, the end part, which previously sealed against the stop between the hole in the nozzle body, has left that position, in so doing forming an annular space. This space, which can be described as a reserve space, is now in direct communication with the grooves 12A, and the quantities of plastic present in the grooves together with any impurities 14 will be forced into this space in conjunction with clean injection and will move in a peripheral direction before finally passing out through the nozzle via the holes.

All that is required after this operation is simply to screw back the filter insert to enable production to be resumed.

In order to remove any small residues that may be forced back into the grooves during the screwing-in operation in conjunction with changes of colour or material, it is sufficient as a general rule to perform a normal injection sequence. It will be appreciated that the nozzle can also be executed so that filter cleaning is achieved by means of, for example, a rotating movement instead of a displacement movement, and that the special features of the invention can also be varied in other respects within the scope of the Patent Claims.

The following are some of the advantages gained by means of the invention:
Easy to clean by injection.
Suitable for reinforced plastics.
Gentle filtration.
Small pressure loss.
Large through-flow area.
Wearing parts are easily replaced.
Suitable for immersion.
Wedge-lock heating tapes can consist of Fe—CuNi.

The invention can be varied within the scope of the Patent Claims and is not restricted to what is described and illustrated above.

What is claimed is:

1. Arrangement for a machine filter, whereby accommodated internally in a casing is a filter body extending in the longitudinal sense of the casing, in that said filter body consists of metal, in that arranged essentially in the longitudinal extent of the filter body is a number of groove-shaped unevennesses in the form of peaks and valleys extending along the filter body on its envelope surface, which unevennesses are executed so as to extend internally within the casing at a distance from it, and in that a gap is formed between the peaks and the casing, whereby the function of said filter body and casing is for quantities of intended objects of a specific kind removable by filtration to be arranged in such a way as to be prevented from moving past the peaks, and to be collected instead in interjacent valleys.

2. Arrangement for a filter for plastic material in the form of granulates supplied to an injection nozzle, whereby accommodated internally in a casing is a filter body extending in the longitudinal sense of the casing, in that said filter body consists of hard metal, in that arranged essentially in the longitudinal extent of the filter body is a number of groove-shaped unevennesses in the form of peaks and valleys extending along the filter body on its envelope surface, the peaks exhibit an essentially pointed cross-sectional form, the valleys exhibit a curved, wave-shaped cross-sectional form, the unevennesses are executed so as to extend internally within the casing at a distance from it, the casing consists of a sleeve of a hard metal, and in that a gap is formed between the peaks and the casing, whereby the function of said filter body and casing is for quantities of intended objects of a specific kind removably by filtration to be arranged in such a way as to be prevented from moving past the peaks, and to be collected instead in interjacent valleys.

3. Arrangement as claimed in Patent claim 2, whereby the groove-shaped unevennesses extend at an angle over the filter body.

4. Arrangement as claimed in one or other of Patent claim 3, whereby the groove-shaped unevennesses are uniformly distributed along the circumference of the filter body.

5. Arrangement as claimed in Patent claim 4, whereby the casting consists of a sleeve of a hard metal material.

6. Arrangement as claimed in Patent claim 2, whereby the groove-shaped unevennesses extend in the form of a spiral over the filter body.

7. Arrangement as claimed in Patent claim 2, whereby the groove-shaped unevennesses extend straight along the filter body.

8. Arrangement as claimed in Patent claim 7, whereby the groove-shaped unevenness extend straight along the filter body.

* * * * *